(12) United States Patent
Hornkvist et al.

(10) Patent No.: US 10,360,902 B2
(45) Date of Patent: Jul. 23, 2019

(54) SYSTEMS AND METHODS FOR PROVIDING IMPROVED SEARCH FUNCTIONALITY ON A CLIENT DEVICE

(71) Applicant: Apple Inc., Cupertino, CA (US)

(72) Inventors: John Hornkvist, Cupertino, CA (US); Vipul Ved Prakash, San Francisco, CA (US); David Salim, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 442 days.

(21) Appl. No.: 14/869,572

(22) Filed: Sep. 29, 2015

(65) Prior Publication Data

US 2016/0357830 A1    Dec. 8, 2016

Related U.S. Application Data

(60) Provisional application No. 62/171,717, filed on Jun. 5, 2015.

(51) Int. Cl.
| | |
|---|---|
| *G10L 15/18* | (2013.01) |
| *G06F 16/2453* | (2019.01) |
| *G06F 16/338* | (2019.01) |
| *G10L 15/22* | (2006.01) |
| *G10L 15/26* | (2006.01) |

(52) U.S. Cl.
CPC .... *G10L 15/1815* (2013.01); *G06F 16/24532* (2019.01); *G06F 16/338* (2019.01); *G10L 15/26* (2013.01); *G10L 2015/227* (2013.01)

(58) Field of Classification Search
CPC ..... G10L 15/26; G10L 15/08; G10L 15/1815; G10L 15/1822; G10L 15/187; G10L 15/197; G10L 15/24; G10L 15/265; G10L 15/30; G06F 17/30401; G06F 17/30654; G06F 17/30684; G06F 17/30696; G06F 17/30867; G06F 17/30905; G06F 17/30976

See application file for complete search history.

(56) References Cited

U.S. PATENT DOCUMENTS

| | | | |
|---|---|---|---|
| 7,818,170 B2 | 10/2010 | Cheng | |
| 8,650,031 B1 | 2/2014 | Mamou et al. | |
| 8,949,266 B2 | 2/2015 | Phillips et al. | |
| 8,990,235 B2* | 3/2015 | King | G06F 17/2211 707/759 |
| 9,043,199 B1 | 5/2015 | Hayes | |
| 2004/0044516 A1* | 3/2004 | Kennewick | G10L 15/22 704/5 |
| 2004/0181407 A1* | 9/2004 | Trinkel | G10L 15/063 704/250 |
| 2004/0193420 A1* | 9/2004 | Kennewick | G06F 16/3329 704/257 |
| 2007/0265850 A1* | 11/2007 | Kennewick | G10L 15/22 704/257 |
| 2008/0052073 A1* | 2/2008 | Goto | G10L 15/06 704/251 |
| 2011/0055256 A1* | 3/2011 | Phillips | G10L 15/30 707/769 |
| 2011/0119298 A1* | 5/2011 | Arrasvuori | G06F 16/9535 707/769 |

(Continued)

*Primary Examiner* — Dennis Truong
(74) *Attorney, Agent, or Firm* — Womble Bond Dickinson (US) LLP

(57) ABSTRACT

A system, method, and machine readable medium are described for providing improved search functionality on a client device.

13 Claims, 14 Drawing Sheets

(56) References Cited

U.S. PATENT DOCUMENTS

| | | | |
|---|---|---|---|
| 2011/0131045 A1* | 6/2011 | Cristo | G06F 17/279 704/249 |
| 2013/0132084 A1* | 5/2013 | Stonehocker | G10L 15/30 704/244 |
| 2013/0144618 A1* | 6/2013 | Sun | G10L 15/065 704/233 |
| 2013/0246437 A1* | 9/2013 | Jacobson | G06F 16/2272 707/741 |
| 2013/0325877 A1* | 12/2013 | Niazi | G06Q 30/0203 707/748 |
| 2014/0136197 A1* | 5/2014 | Mamou | G10L 15/08 704/235 |
| 2015/0019216 A1 | 1/2015 | Singh et al. | |
| 2016/0035348 A1* | 2/2016 | Kleindienst | G06F 17/30905 704/235 |
| 2016/0179934 A1* | 6/2016 | Stubley | G06F 17/30401 707/722 |
| 2017/0193060 A1* | 7/2017 | Khanzode | G06K 9/00442 |

* cited by examiner

SYSTEMS AND METHODS FOR PROVIDING IMPROVED SEARCH FUNCTIONALITY ON A CLIENT DEVICE

This application claims the benefit of U.S. Provisional Patent Application No. 62/171,717, filed on Jun. 5, 2015 which application is incorporated herein by reference.

BACKGROUND OF THE INVENTION

This invention relates generally to the field of client-side search functionality. More particularly, the invention relates to systems and methods for improving search functionality on a client device by improving, among other things, reliability of the search functionality and improving the accuracy of query processing.

Modern client devices, such as general-purpose computer systems, smart phones, laptops, and tablets, allow users to search for local and external results based on a received query. Local results include locally stored files bearing a particular level of relevance to the received query. Similarly, external results include websites, files stored on a networked computer, among other results that bear a particular level of relevance to the received query. Queries are often unstructured written natural language, and increasingly often, unstructured spoken natural language.

In typical search functionality, such as the Spotlight program, which operates on Macintosh computers from Apple, Inc. of Cupertino, Calif., the various content, file, and metadata are indexed, in what is commonly referred to as an inverted index, for later retrieval using the program. For example, an inverted index might contain a list of references to documents in which a particular word appears. Given the changing nature of files on a computer, the reliability of the index for search depends partially on periodic updates to the index reflecting changes to local files. These periodic updates depend on programs that update the files on the computer to provide application information to the index so that it may accurately reflect the state of the modified files.

Query results are often sorted by a variety of criteria, including relevance, date last modified, date last opened, among others. By default, query results may be presented in order of a determined relevance to the query, but may also provide the user an option to change the criteria by which the results are being presented. The usefulness of the typical sorting methods to a user depends on whether the sorting criteria will actually help the user find what he or she is looking for, and whether the user is aware of the varying sort criteria for the particular search functionality he or she are using.

Some search functionalities, such as Google web search, accept unstructured queries in the form of written natural language. Using a variety of techniques in natural language processing, the unstructured query is interpreted and a search is conducted based on the interpretation. Similarly, some search functionalities accept unstructured queries in the form of spoken natural language. Using a variety of techniques in speech to text recognition, the spoken query is interpreted and a search is conducted based on the interpretation.

As more users depend on their electronic devices to create, store, and share files, the need for improved search functionality has increased significantly. Providing search functionality on a client device that is reliable, produces readily usable results, and is accurate when executing written or spoken natural language queries is of great importance to improving the everyday user experience of a modern electronic device.

SUMMARY OF THE DESCRIPTION

In one or more embodiments described herein, a search functionality is provided to execute a query and provide results to a user of a computer. In one embodiment, the search functionality maintains an index that is periodically updated to reflect changes relating to the files on the computer. In one embodiment, the search functionality requests that applications on the computer provide application information required to update the index. In one embodiment, when the applications are operable to provide the application information required to update the index, the applications export the application information to the index. In one embodiment, when the search functionality detects that the applications are inoperable to provide the application information required to update the index, application extensions are initiated and requested in lieu of the application to provide the application information required to update the index.

In one embodiment, the application extensions have equal access privileges to the application information as the applications that they extend. In one embodiment, initiating the one or more application extensions does not require launching the applications that they extend. In one embodiment, application information required to update the index includes metadata relating to files modified by the application. In one embodiment, the application information required to update the index includes changes to a search relevance parameter utilized by the search functionality. In one embodiment, the application information required to update the index includes context relating to one or more files created or modified by the application. In one embodiment, the index is an inverted index of full text content from files of a plurality of different applications.

In another embodiment, the search functionality uses available contextual information to modify the presentation of query results to the user. In one embodiment, the contextual information includes previous selection of query results by the user of the computer. In one embodiment, contextual information includes the frequency with which a user of the computer uses a particular application. In one embodiment, contextual information includes the amount of time which a user of the computer has actively used an application. In one embodiment, contextual information includes whether the computer is connected to one or more wireless networks. In one embodiment, contextual information includes the hardware specifications of the computer providing the search functionality. In one embodiment, contextual information includes information from other users of the search functionality on other computers. In one embodiment, the presentation of query results is further modified by the presence of search terms of the query in predetermined file locations.

In another embodiment, the search functionality receives a natural language query, referred to as an unstructured query, and determines structured queries to execute. In one embodiment, the search functionality determines one or more structured queries from the unstructured query based on a grammatical interpretation of the unstructured query and available contextual information. In one embodiment, the search functionality then executes a search using the one or more structured queries and the unstructured query and presents all the results to the user. In one embodiment, the grammatical interpretation of the unstructured query includes using a query grammar to parse the unstructured query without requiring user input. In one embodiment, the available contextual information modifies the rules of the query grammar. In one embodiment, the grammatical interpretation of the unstructured query includes identifying keywords associated with particular types of computer files. In one embodiment, the partial execution of the one or more structured queries is used to determine the best grammatical interpretation of the unstructured query. In one embodiment, when an unstructured query has met a predetermined threshold of ambiguity, a second unstructured query is suggested to the user for an improved search.

In another embodiment, the search functionality receives a user's voice input as a search query. In one embodiment, the search functionality transmits, over one or more networks, the search query to one or more data processing systems to produce one or more speech to text recognitions. In one embodiment, the one or more data processing systems execute one or more parallel search queries to search remotely stored indices based on the one or more speech to text recognitions. In one embodiment, the one or more speech to text recognitions and results of the one or more parallel searches are received by the search functionality. In one embodiment, the search functionality determines one or more search queries based on the speech to text recognitions and executes the one or more search queries to search a locally stored index. In one embodiment, the search functionality presents the combined results of the one or more search queries and the parallel search queries to the user.

In one embodiment, the presentation of the combined results of the queries is based on the speech to text recognition that has the highest probability of being accurate. In one embodiment, the determination of accuracy of a speech to text recognition is based on comparing the results of the one or more search queries, the parallel search queries, and the respective speech to text recognitions on which they are based. In one embodiment, a higher probability of accurate speech to text recognition is determined when a speech to text recognition produces more results for its corresponding search queries than other speech to text recognitions. In one embodiment, the probability of accurate speech to text recognition is determined by resolving ambiguities in the user's voice input. In one embodiment, resolving ambiguities includes distinguishing between likely utterances and unlikely utterances and determining whether an unlikely utterance produces more local search results than a likely utterance. In one embodiment, historical data from previous voice searches by the user is used to resolve ambiguities.

Various data processing systems and methods and non-transitory machine readable media, such as DRAM or flash memory, are described herein as part of the various embodiments described.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearance of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below, and depicted in the figures, in terms of some sequential operations, it should be appreciated that some of the operations described may be performed in a different order. Moreover, some operations may be performed in parallel rather than sequentially.

In one embodiment, one or more application extensions are initiated to provide application information required to update the index of a search functionality on a computer. The index can be, for example, an inverted index of full text content from files of a plurality of different applications. In one embodiment, when it is detected that one or more applications are inoperable to provide application information required to updated an index on the computer, one or more application extensions can be initiated to provide the application information required to update the index instead of the applications that they extend.

Figure 1:
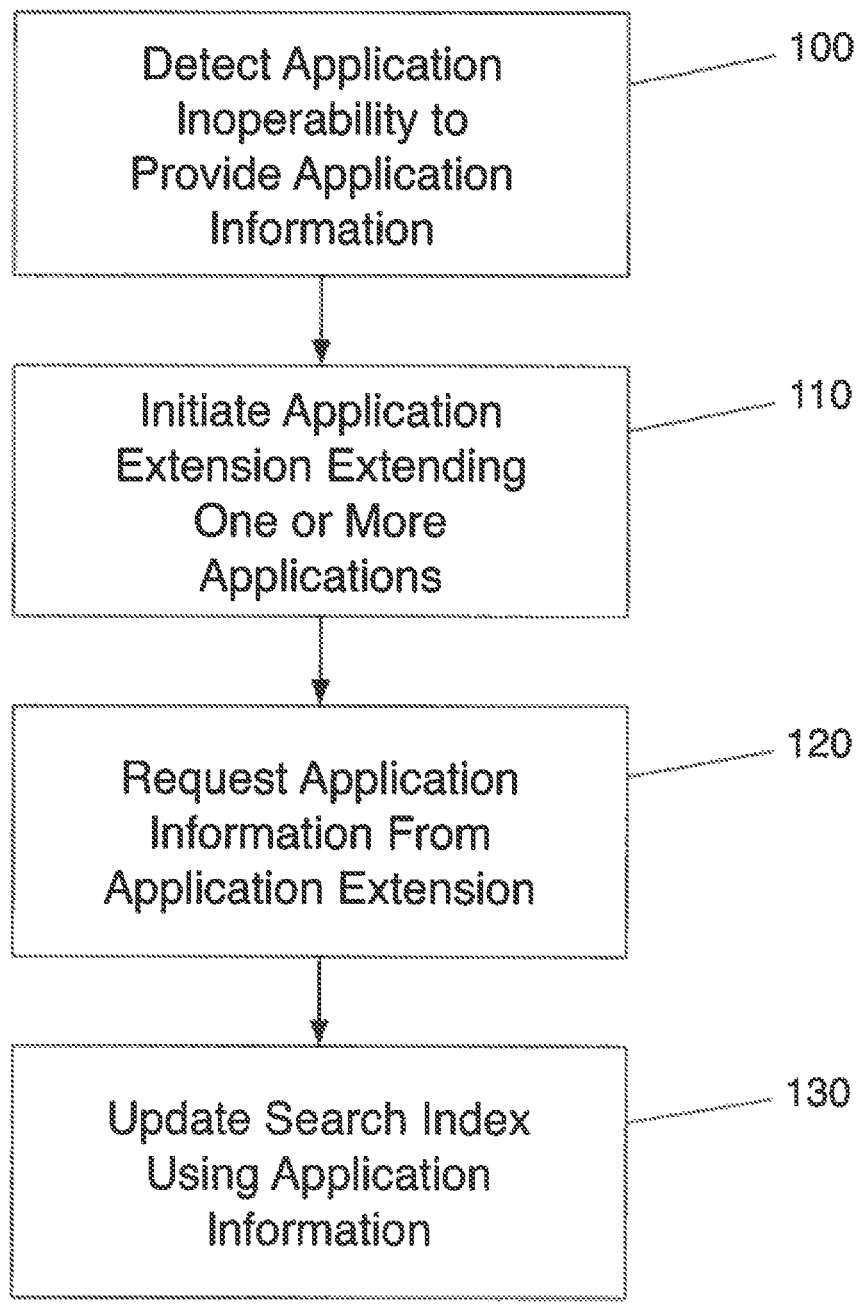
FIG. 1 is a flowchart of a method according to one embodiment for providing a search functionality using application extensions to update a search index.

FIG. 1 shows a flowchart of a method according to one embodiment for providing a search functionality using application extensions to update a search index. In operation 100 of the method shown in FIG. 1, a search functionality software detects that an application is inoperable to provide application information. In one embodiment, the application information is required to update an index of the search functionality. In one embodiment, the inoperability of an application is detected by detecting an unexpected failure of the application, but a person of ordinary skill in the art will recognize there other detectable states in which an application will be inoperable to provide application information, such as an unavailability of system resources to run the application, inadequate user access privileges, or quite simply, that the application is not presently running.

If it is detected that the application is inoperable in operation 100, then operation 110 initiates an application extension extending one or more applications. In one embodiment, the application extensions can have equal access privileges to the application information as the applications that they extend even in systems which provide security by using sandboxes to restrict privileges of an application. As a result, an application extension can provide the application information in a similar manner that the application would. In one embodiment, initiating the one or more application extensions does not require launching the application that they extend. As a result, initiating an application extension instead of an application to request the application information required to update the index of the computer can be done without utilizing more system resources than necessary.

In operation 120 of the method shown in FIG. 1, the search functionality software requests the application information from the application extension. In one embodiment, the application information required to update the index can include metadata relating to files modified by the application. The metadata can be used to update the index to reflect the changes that have taken place on application files, such as changing the content of an application file. In one embodiment, the application information can include changes to a search relevance parameter. In one embodiment, the changes to the search relevance parameter can be used to sort the results before presenting them to the user of the computer conducting a search query. In one embodiment, the application information can include context relating to one or more files created or modified by the application.

In operation 130 of the method shown in FIG. 1, the search functionality software updates the search index using the application information it requested from the application extension. In so doing, the search functionality can update the search index to accurately reflect the state of the file system. Later search queries executed using the search functionality software can be more reliable than if the index remains outdated when an application is inoperable to provide the application information required to update the search index.

Figure 2:
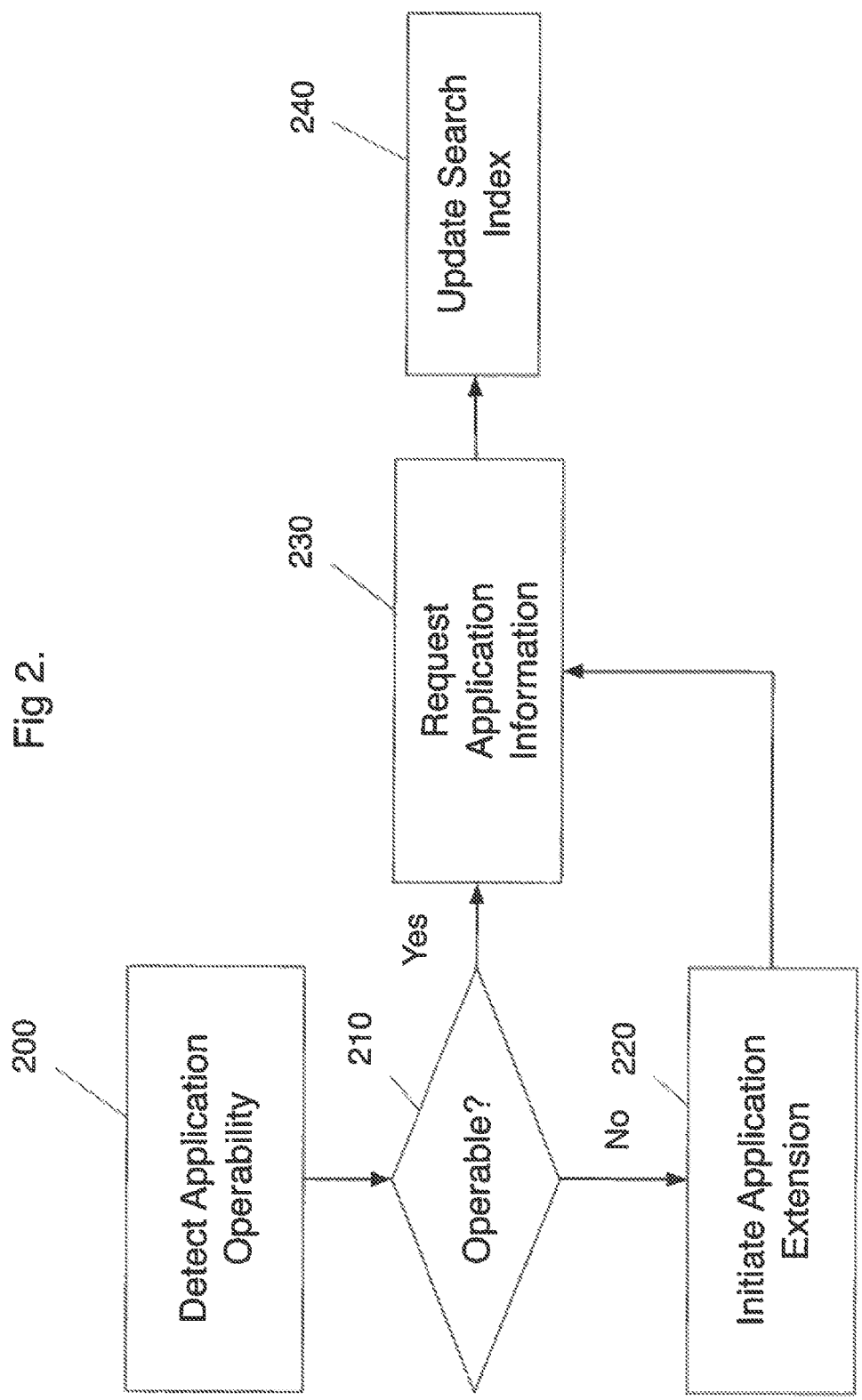
FIG. 2 is a flowchart of a method according to one embodiment for providing a search functionality using an application or application extension to update a search index depending on the operability of the application.

FIG. 2 shows another flowchart of a method according to one embodiment for providing a search functionality using an application or application extension to update a search index depending on the operability of the application. In operation 200 of the method shown in FIG. 2, a search functionality software detects the operability of an application to provide application information required to update a search index on the computer. At operation 210, the search functionality will request the application information directly from the application in operation 230 if it detects the application is operable to provide the application information. In this case, the application exports the application's new or changed content and metadata ("application information") to update the search index. If the application is not operable to provide the application information, the search functionality software initiates an application extension that extends the inoperable application in operation 220. In operation 230, if after initiating the application extension, the search functionality software will request application information from the application extension instead of the inoperable application. In operation 240, the search functionality software can update the search index using the requested application information.

Figure 3:
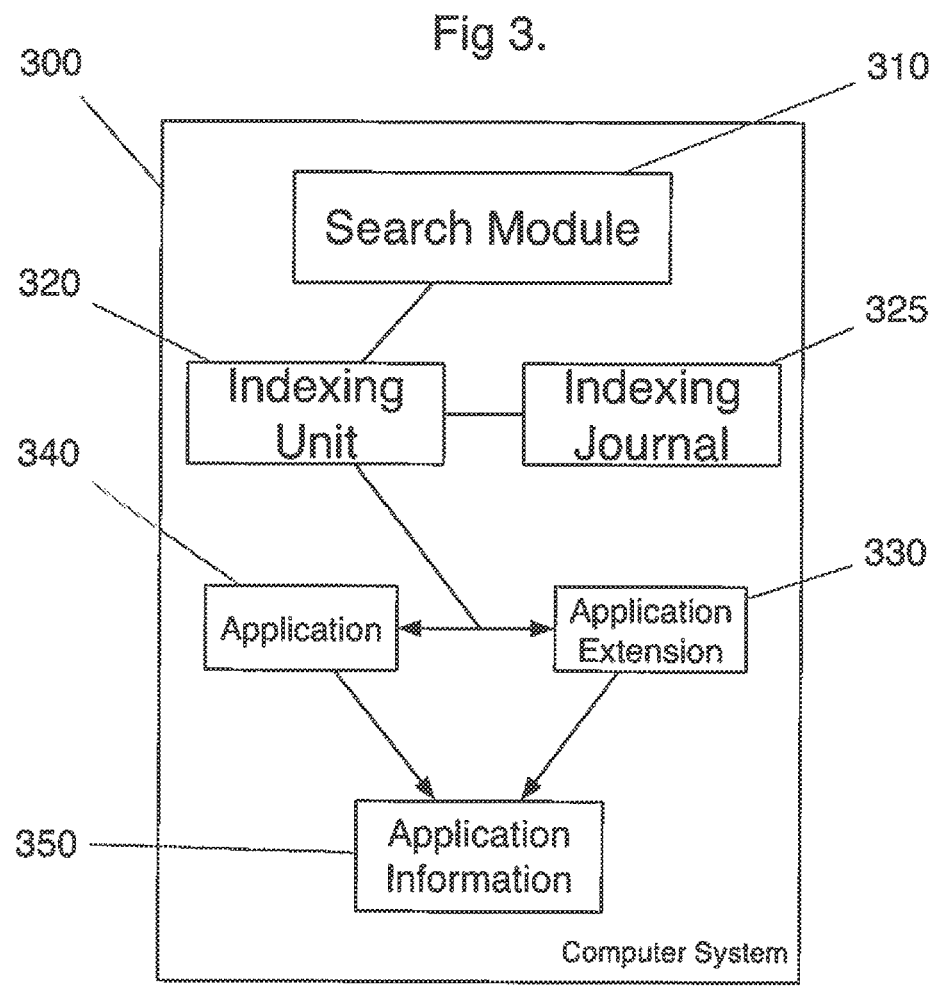
FIG. 3 shows an example of a client device which can be used to store various software components including various application programs and search functionality software components.

FIG. 3 shows an example of a client device which can be used to store various software components including various application programs and search functionality software components. The computer system 300 contains at least files and program instructions in its memory. The search module 310 is part of a search functionality software that allows a user to search for files based on an inputted query. In order to provide search results to a query input by the user, the search module uses an index to identify results that are relevant to the query. The indexing unit 320 is part of the search functionality software that maintains the index utilized by the search module 310. An indexing journal 325 maintains a journal of the progress of indexing operations and is similar to a journal for a file system (as in journaled file system); the journal can keep track of indexing operations in terms of if they have begun and whether they have been completed. This allows a system to recover from an interruption (e.g. a system crash) in indexing operations and to resume or begin anew. If a generation of indexing information is missing, the journal can be used to rebuild a portion of the index. When indexing journal 325 determines it is time to perform an update on the index, the indexing unit 320, depending on the operability of an application 340, will either request application information 350 from application 340 or application extension 330. If application 340 is operable to provide application information 350 to the indexing unit 320, then the indexing unit 320 requests the application information 350 from the application 340. If application 340 is not operable to provide application information 350 to indexing unit 320, application extension 330 is initiated and indexing unit 320 requests the application information 350 from the application extension 330 instead of application 340.

Figure 4:
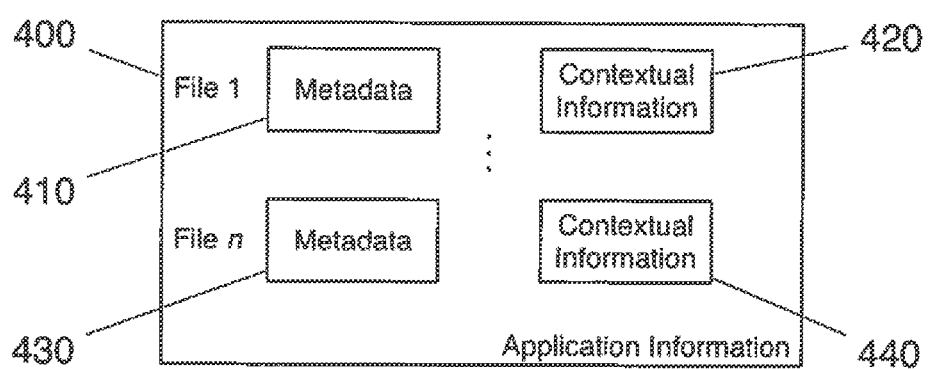
FIG. 4 shows an example of a data structure for application information including metadata and contextual information corresponding to a number of files used by an application.

FIG. 4 shows an example of a data structure for application information including metadata, content and contextual information corresponding to a number of files used by an application. Application information 440 can include metadata 410 and contextual information 420 for a file associated with an application, and may further contain metadata 430 and contextual information 440 for an arbitrary number of files associated with an application. In addition, content of the files (e.g. full text content) can also be part of data structures for the application. The metadata 410 and 430 can include information about a file such as the author, the date it was last modified, file size, while contextual information 420 and 440 can include information about the status of a file with regard to a search functionality software such a search relevance parameter. The contents of application information 440 are utilized to update a search index that is used by the search functionality software to return results to a user in response to a query.

The embodiments above address a difficult balance between maintaining an updated search index to provide reliable search functionality to a user and preserving system resources consumed in doing so. Updating a search index using a low-resource consuming application extension instead of a high-resource consuming application enables for an updated search index that does not require fully operational applications to provide application information required to update the search index when the application is not operable to do so. An application extension need not be launched at all, and the update to the search index can be delayed, if for example, system resources cannot be allocated to the application extension. Similarly, if system resource savings of initiating an application extension instead of an application are insufficient to outweigh the benefits of launching an application, such as anti-virus software, the application may be launched instead of the application extension in order to maintain the benefits of the application.

In another embodiment, search results of a query can be ranked based on contextual information and presented to a user according to said ranks in order to improve the likelihood that a user will find the intended object of the search query with the search functionality. In one embodiment, query results can be further modified by the presence of search terms of the query in predetermined file locations. For example, the presence of a search term in the title of a document can be ranked higher than the presence of a search term in a footnote of a document. In another embodiment, the manner of query execution can also be modified by the retrieved contextual information.

Figure 5:
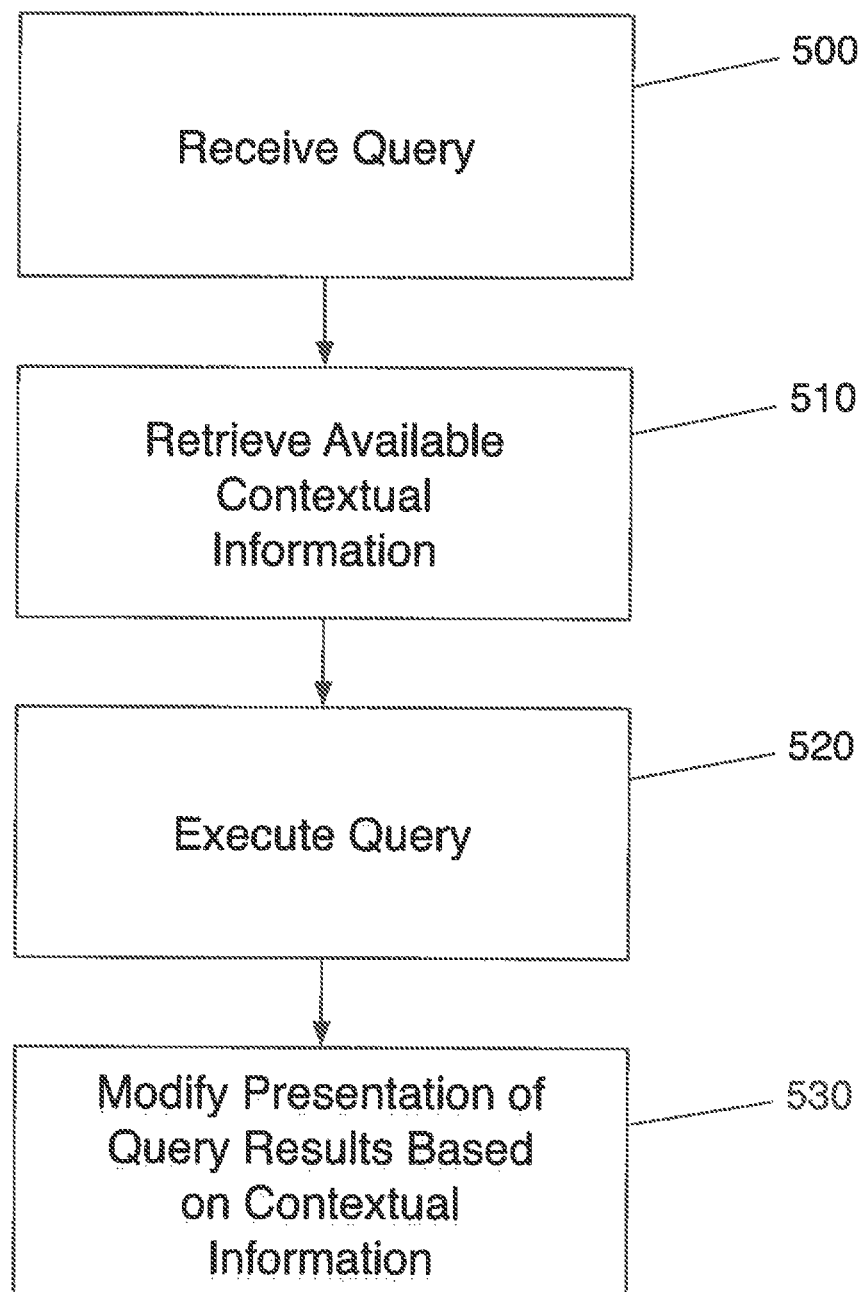
FIG. 5 is a flowchart of a method according to one embodiment for providing a search functionality using available contextual information to modify the presentation of query results.

FIG. 5 shows a flowchart of a method according to one embodiment for providing a search functionality using available contextual information to modify the presentation of query results. In operation 500 of the method illustrated in FIG. 5, a search functionality software receives a query from a user. In operation 510, the search functionality software retrieves available contextual information relevant to the user's search query. In operation 520, the search functionality software executes the query received from the user. In operation 530, the query results are presented to the user as modified based on the retrieved contextual information of operation 510.

Figure 6:
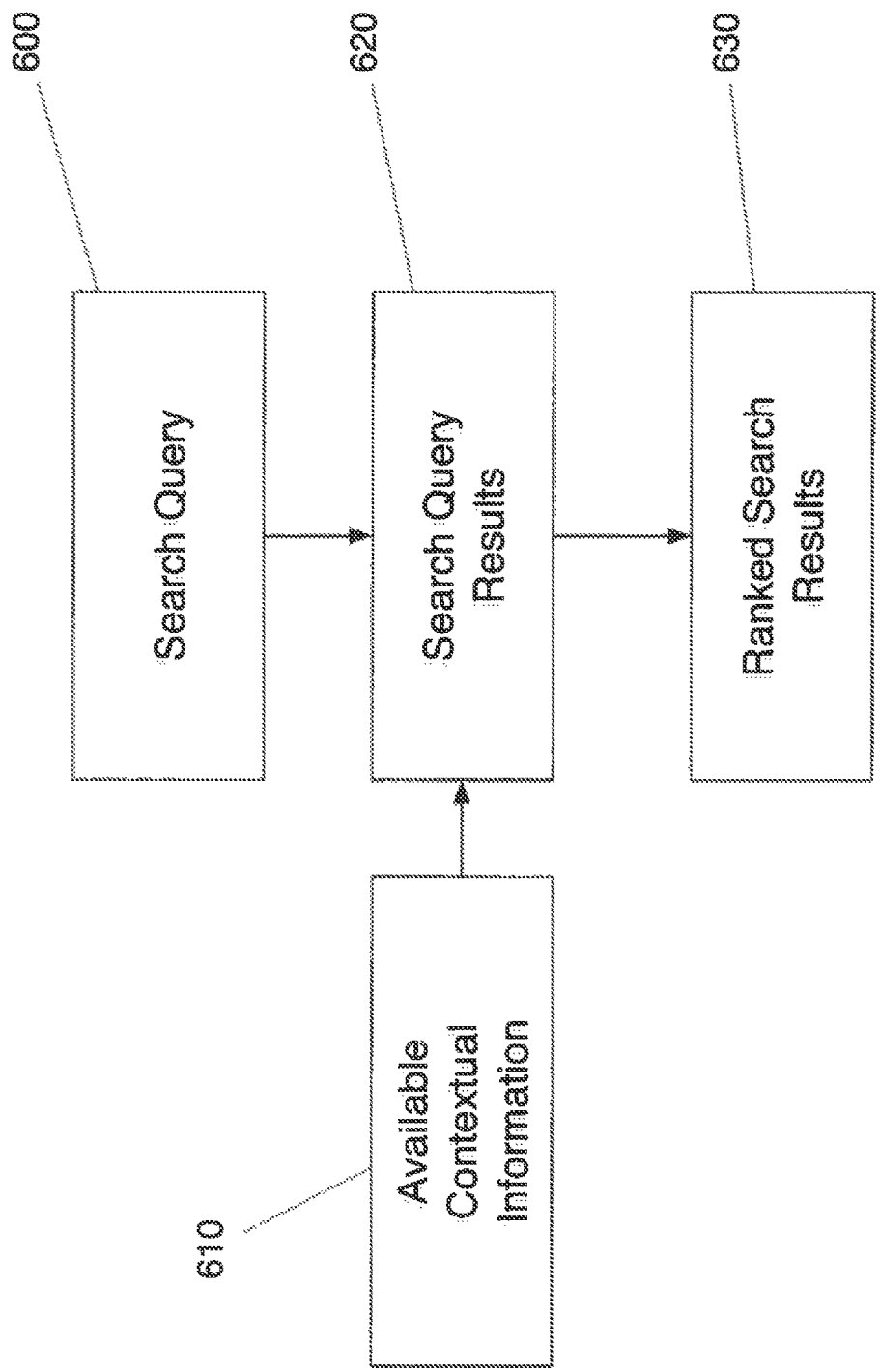
FIG. 6 shows an example of an embodiment where available contextual information and search query results are used to produce ranked search results.

FIG. 6 shows an example of an embodiment where available contextual information and search query results are used to produce ranked search results. Search query 600 is received by a search functionality software as input by a user. The query is executed to produce search query results 620, which are processed with available contextual information 610 by the search functionality software to produce ranked search results 630. The contextual information 610 used to produce search results 630 can be any combination of one or more pieces of data that bear relevance to the likelihood that a particular search result is the desired object of a user's search query. The contextual information 610 may include data about a user, for example, the previous selection of query results, the frequency with which an application is used, a set of one or more times that an application has been historically used, the availability of, or connection to, a particular wireless network, or the hardware specifications of the computer. In addition to contextual information about a particular user, contextual information 610 may include contextual information about a general class of user, such as a community of which the user is a member. For example, contextual information 610 may include previous selections of query results by other users of the search functionality, among others.

Figure 7:
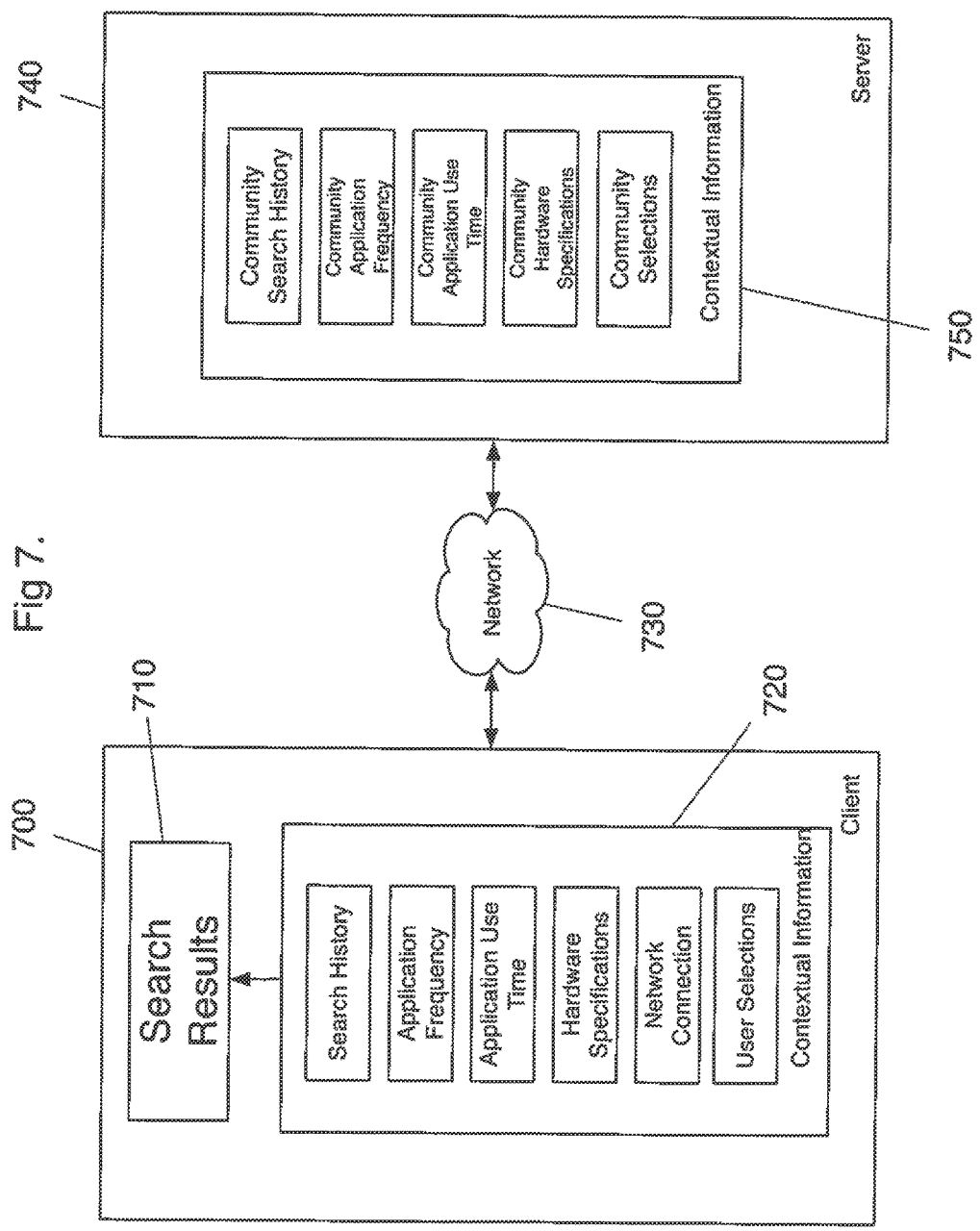
FIG. 7 shows an example of a system that uses contextual information from a client device and contextual information from a server over a network to produce ranked search results.

FIG. 7 shows an example of a system that uses contextual information from a client device and from a server over a network to produce ranked search results. Client 700 uses search functionality software to modify the presentation of search results 710 with contextual information 720 and 750. Contextual information 750 is received over a network 730 from a server 740. The search functionality software can use the contextual information 720 and 750 to rank the search results in a manner that, when presented to the user, facilitates the selection of the object of the user's search query. Contextual information 720 contains local information such as a user's search history, the frequency of application use (on a per application basis) on the client, the amount of time applications (on a per application basis) are used on the client, the hardware specifications of the client, the network connections available to the client at the time of the search query, as well as user selections in previous queries. Contextual information 750 contains community information such as a community search history, the frequency of application use (on a per application basis) in the community, the amount of time applications are used by the community, hardware specification of the community, as well as community selections in previous queries.

While some of the embodiments describe community information as information received over a network, community information may also be available locally. For example, local community information may include contextual information about various users of a single computer system. In one embodiment, each user of a computer system may have contextual information associated with his or her user account exclusively. For example, if user Alice and user Bob both use the same computer system, but Alice tends to watch videos while Bob tends to play video games, contextual information about each user may not be useful to the ranking of search results for the other. In such a case, contextual information about a particular user may be used exclusively for the particular user when the search functionality software detects that the particular user is logged in, as opposed to being used as local community information.

The embodiments above seek to provide a search functionality that presents results to a user in a user-personalized fashion. By ranking the search results based on available contextual information about a user, the ranked results can be presented in the order most likely to provide the object of the user's search as readily as possible. A user at work, for example, may use an application frequently at work and may often utilize a particular wireless network at work. The search functionality software can, for example, rank results for files of the frequently used application higher if the search functionality also detects that the user is connected to the particular wireless network. In so doing, the search functionality software can dynamically change the ranking scheme in order to present user-personalized, context-sensitive results that increase the ability for a user to find the object of his or her search.

Similarly, contextual information about a community of users may be used to rank search results when there is insufficient contextual information about the user who is conducting the search. The search functionality software can, for example, receive a query from a new user. The only contextual information available may be the user's hardware specification. However, the search functionality software can retrieve contextual information about a community of users over a network and improve the presentation of search results using aggregate community data from other users. When there is contextual information about a user as well as contextual information about a community, a ranking scheme may use one or both to form a ranking weight schema and accordingly present results of a search query to a user. The weight accorded to each piece of contextual information, whether from the client or the server, in a ranking scheme may be adjusted over time as the strength of a contextual information about a user is determined to be greater than contextual information about a community, and vice-versa.

The weight accorded to each piece of contextual information, whether from the client or the server, in a ranking scheme may also be adjusted over time as a user signals a failed or non-optimal result presentation. A user, for example, may signal a non-optimal result presentation by retyping the query, spending a long time looking through the presented results, or selecting a lowly ranked result. By continuously monitoring the performance of the ranking scheme based on contextual information of a user, the presentation of search results to a particular user can be improved, while also providing contextual information as a member of a community for new or similar users.

In another embodiment, one or more structured queries can be determined from an unstructured query based on a grammatical interpretation of the unstructured query and available contextual information. The structured queries can then be executed along with the unstructured query and the results can be presented to the user. In one embodiment, the grammatical interpretation of the unstructured query can include using a query grammar to parse the unstructured query without requiring user input to parse the unstructured query. The query grammar can be a set of rules that associate terms of a search query with particular types of computer files and metadata associated with computer files. For example, an unstructured query such as "gifs from Elise" may be parsed to determine associations for "gifs," "from," and "Elise." "Gifs" may be associated with the file type for generated image files, "from" may be associated with messages or e-mail originating from others, and "Elise" may be associated with files associated with a person named Elise. These associations can in turn be used to determine structured queries to be executed by the computer in order to return search results with increased likelihood of containing the object of the user's search query.

In one embodiment, the rules of the query grammar can be modified in order to determine structured queries more effectively. Past selections by a user, for example, may indicate that a user intends for a particular term to have a particular meaning. As with the previous example, a search for "gifs from Elise" may have provided results for various types of communications, including, for example, text messages, e-mail, and calendar invites. If a user has consistently selected e-mail files when inputting similar queries utilizing "from" like "pictures from Italy" or "spreadsheets from Bob," the query grammar may be modified to more strongly associate the search term "from" with e-mail files. In one embodiment, contextual information about a user, or a community of users, can be used to modify the rules of the query grammar. For example, contextual information about a user, such as the user's contacts, songs, album names, application names, or other available contextual information as described above, can be used to modify the rules of the query grammar that associate certain terms of a search query with particular types of computer files and metadata associated with computer files.

Figure 8:
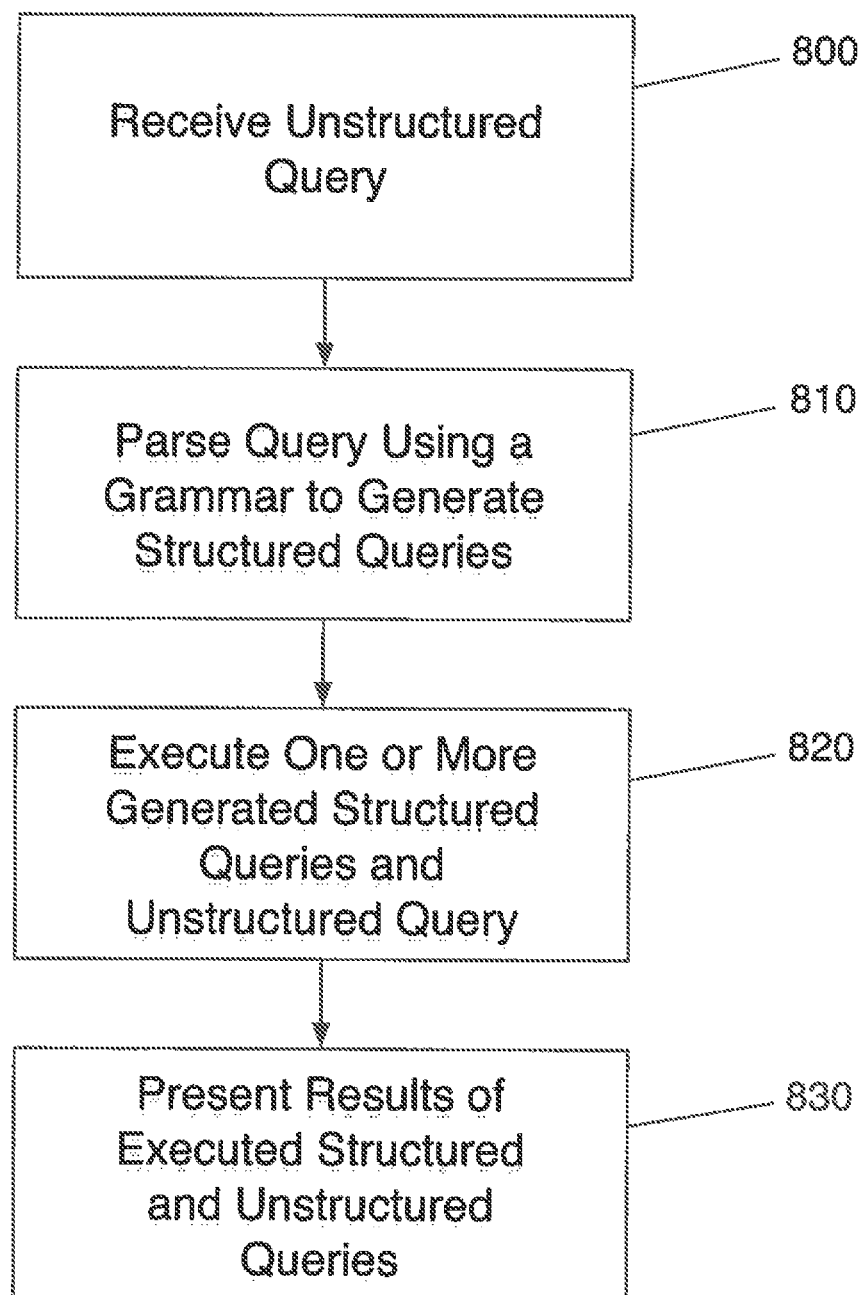
FIG. 8 is a flowchart of a method according to one embodiment for providing a search functionality using a grammar to parse an unstructured query to generate structured queries to be executed in addition to the unstructured query.

FIG. 8 shows a flowchart of a method according to one embodiment for providing a search functionality using a grammar to parse an unstructured query to generate structured queries to be executed in addition to the unstructured query. In operation 800 of the method illustrated by FIG. 8, a search functionality software receives an unstructured query, which can include a natural language query. In operation 810, the search functionality software parses the unstructured query using a grammar to generate structured queries. As described above, the grammar can be a query grammar to parse the unstructured query without requiring user input to parse the unstructured query. A grammar can also be used to identify keywords associated with particular types of computer files. Independent of the grammar used, in operation 820 the search functionality software executes both the structured queries generated from the grammatical interpretation of the unstructured query, and the unstructured query itself. In operation 830, the search results for both the structured queries and unstructured queries are presented to the user. The results may then be presented to the user of the search functionality according to well-known methodologies, or according to the methods described herein, such as by ranking the search results based on available contextual information.

A grammar can sometimes produce multiple grammatical interpretations of an unstructured query. Each grammatical interpretation can produced one or more structured queries, which when executed together, can be resource-intensive and produce far too many results. Similarly, more than one grammar can be used to produce a set of grammatical interpretations. Similar to a single grammar with various grammatical interpretations of an unstructured query, executing a large number of structured queries may produce excessive results that are not useful to the user of the search functionality. As such, one embodiment can determine a best grammar and/or grammatical interpretation to generate structured queries in order to focus the scope of the search.

Figure 9:
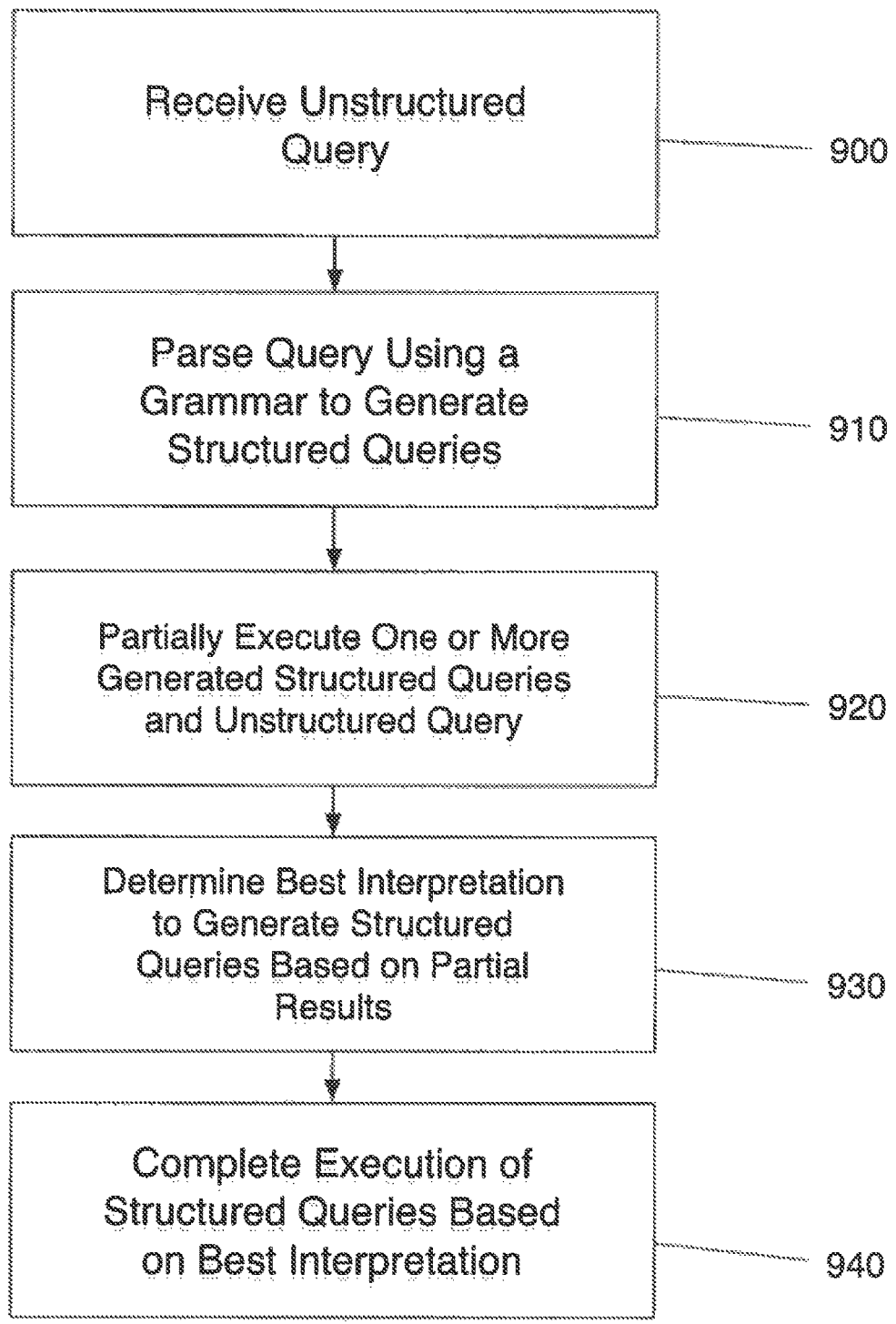
FIG. 9 is a flowchart of a method according to one embodiment for determining a best grammatical interpretation to generate structured queries using partial execution results of generated structured queries.

FIG. 9 shows a flowchart of a method according to one such embodiment for determining a best grammatical interpretation to generate structured queries using partial execution results of generated structured queries. In operation 900 of the method illustrated by FIG. 9, a search functionality software receives an unstructured query, which may be a natural language query. In operation 910, the unstructured query is parsed using a grammar to generate structured queries based on one or more grammatical interpretations. In one embodiment, several grammars may be used to generate structured queries based on one or more grammatical interpretations. In operation 920, the search functionality software partially executes one or more of the generated structured queries, and the unstructured query. In one embodiment, the extent to which a query is executed can be based on the expected computational complexity of doings so or be based on what extent is necessary to make a meaningful comparison in operation 930. In operation 930, a best grammatical interpretation is determined to generate a set of structured queries based on the partial results. In one embodiment, the set generated in operation 930 may expand upon the original set generated in operation 910. Finally, in operation 940, the full execution of the structured queries based on the best grammatical interpretation is completed.

An unstructured query can sometimes be difficult to parse with a grammar because it deviates from any substantially recognizable pattern that can be interpreted by the grammar. In such a case, it may be difficult or impossible to generate useful structured queries from the unstructured query input by the user. In one embodiment, the search functionality software can determine that an unstructured query has met or exceeded a threshold of ambiguity. In one embodiment, the search functionality query can determine a second unstructured query as a suggestion for the user to modify their unstructured query. In one embodiment, a structured query may be presented as a suggestion for the user to modify their unstructured query. For example, a structured query based on the received unstructured query may be presented as a set of tokens associated with identified elements of the file system. In one embodiment, a suggestion can be based on a prediction of what the user's final query will be. In one embodiment, determining the suggested query, whether unstructured or structured, can be based on contextual information about the user, or a community of users, as described above. In one embodiment, contextual information can include a language model based on previous user input or other available contextual information.

Figure 10:
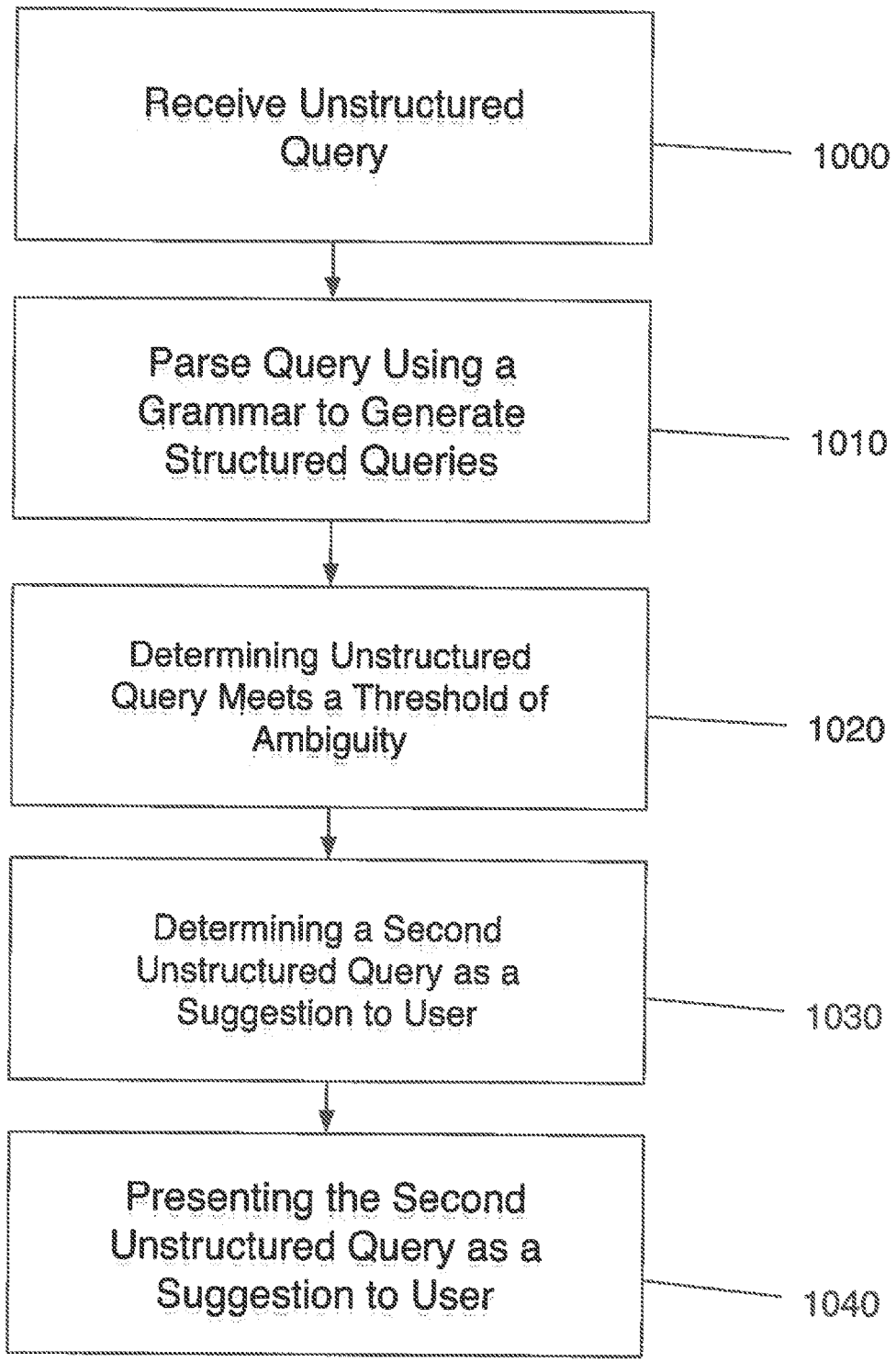
FIG. 10 is a flowchart of a method according to one embodiment for presenting a second unstructured query as a suggestion to the user when his or her original query has met a threshold of ambiguity.

FIG. 10 shows a flowchart of a method according to one such embodiment for presenting a second unstructured query as a suggestion to the user when his or her original query has met a threshold of ambiguity. In operation 1000 of the method illustrated in FIG. 10, a search functionality software receives an unstructured query, which may be a natural language query. In operation 1010, the query is parsed using a grammar to generate one or more structured queries based on one or more grammatical interpretations of the unstructured query. As described above, in operation 1020, the search functionality software can detect that an unstructured query has met a threshold of ambiguity. In other words, the search functionality software can ascertain that a particular unstructured query does not produce suitable structured queries to conduct an adequate search. A threshold of ambiguity may be determined when, for example, an excessive number of structured queries are generated due to a large number of possible grammatical interpretations. A threshold of ambiguity may also be determined when, for example, too few results are produced by the structured queries based on grammatical interpretations.

If it is determined that a threshold of ambiguity is met for the unstructured query in operation 1020, in operation 1030 the search functionality software determines a second unstructured query as a suggestion to the user. The search functionality software can determine a second unstructured query as a suggest by, for example, parsing through the query to identify a focal point of ambiguity in an unstructured query and identifying what new or substituted words would adequately reduce the ambiguity. In one embodiment, the second unstructured query can be based on variations of the unstructured query that produce improved search results compared to the received unstructured query. In one embodiment, similar to identifying the best grammar and/or grammatical interpretation by partially executing queries for them, the best suggestion among a set of unstructured queries that are candidates for suggestion may be determined by partially executing queries for them. Finally, in operation 1040, once the second unstructured query is determined in operation 1030, the second unstructured query is presented as a suggestion to the user.

In another embodiment, a search query can be a user's voice input. The search query can be transmitted, over one or more networks, to one or more data processing systems in order to produce one or more speech to text recognitions and execute a parallel search on one or more remotely stored indices to produce parallel search results. The one or more text recognitions and parallel search results can be received, independently or together, and the text recognitions can be used to determine one or more search queries to be executed on a locally stored index. The results of the parallel search and local search can be combined and presented to the user.

Figure 11:
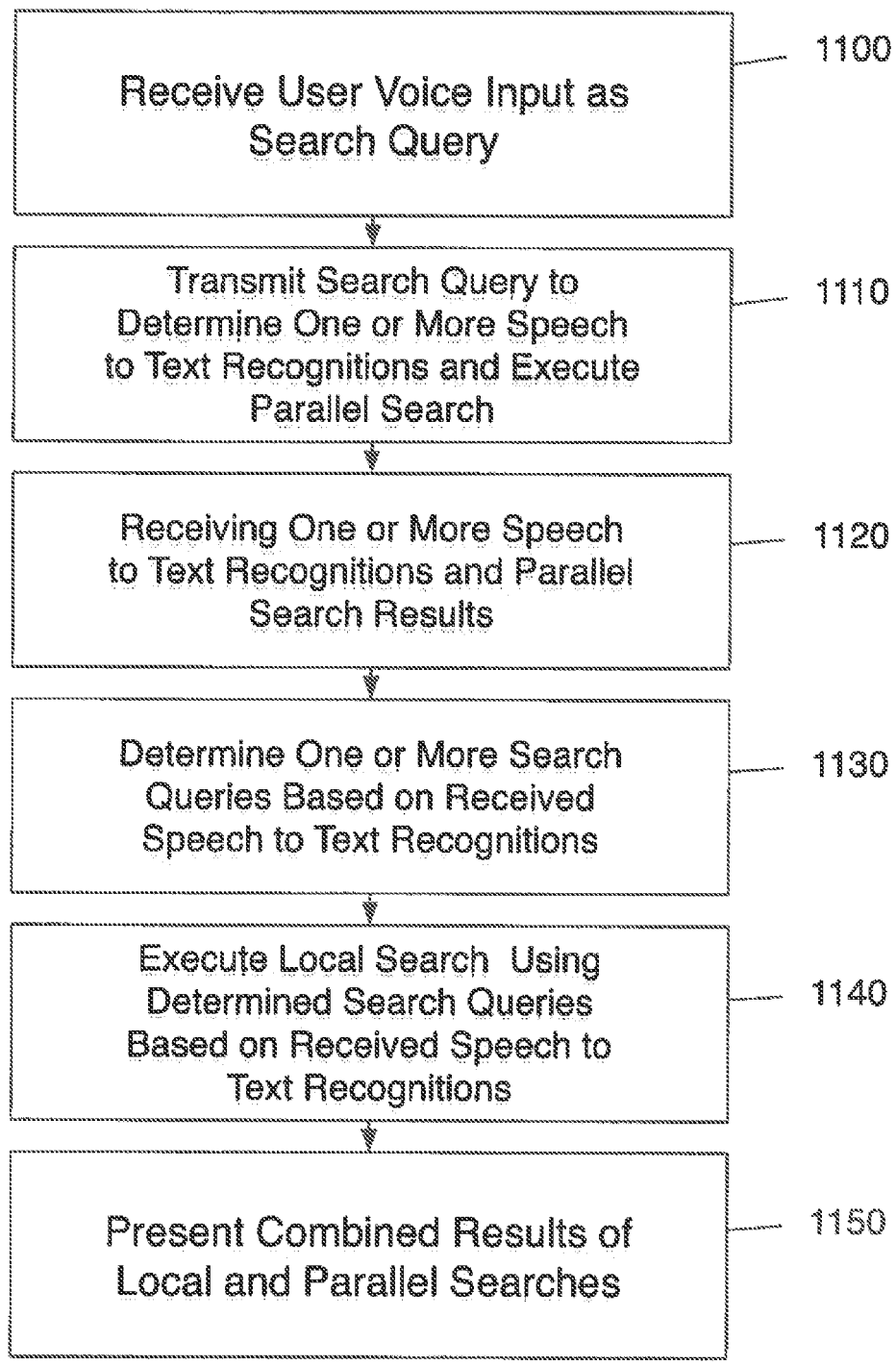
FIG. 11 is a flowchart of a method according to one embodiment for providing a search functionality that processes user voice input to determine one or more speech to text recognitions, executes a search in parallel, and combines parallel search results with local search results.

FIG. 11 shows a flowchart of a method according to one embodiment for providing a search functionality that processes user voice input to determine one or more speech to text recognitions, executes a search in parallel, and combines parallel search results with local search results. In operation 1100 of the method illustrated in FIG. 11, a search functionality software receives user voice input as a search query. In operation 1110, the search query is transmitted to one or more data processing systems in order to determine one or more speech to text recognition. In operation 1110, the one or more data processing systems also execute a parallel search using the one or more speech to text recognitions. In operation 1120, the search functionality software receives the one or more speech to text recognitions and parallel search results. In one embodiment, the receipt of parallel search results can occur in parallel with one or both of operations 1130 and 1140. In operation 1130 of the method illustrated in FIG. 11, the search functionality software determines one or more search queries based on received speech to text recognitions. In operation 1140, the search functionality software executes a local search using the determined search queries of operation 1130. In operation 1150, the local search results and parallel search results are combined and presented to the user who input the voice query.

Figure 12:
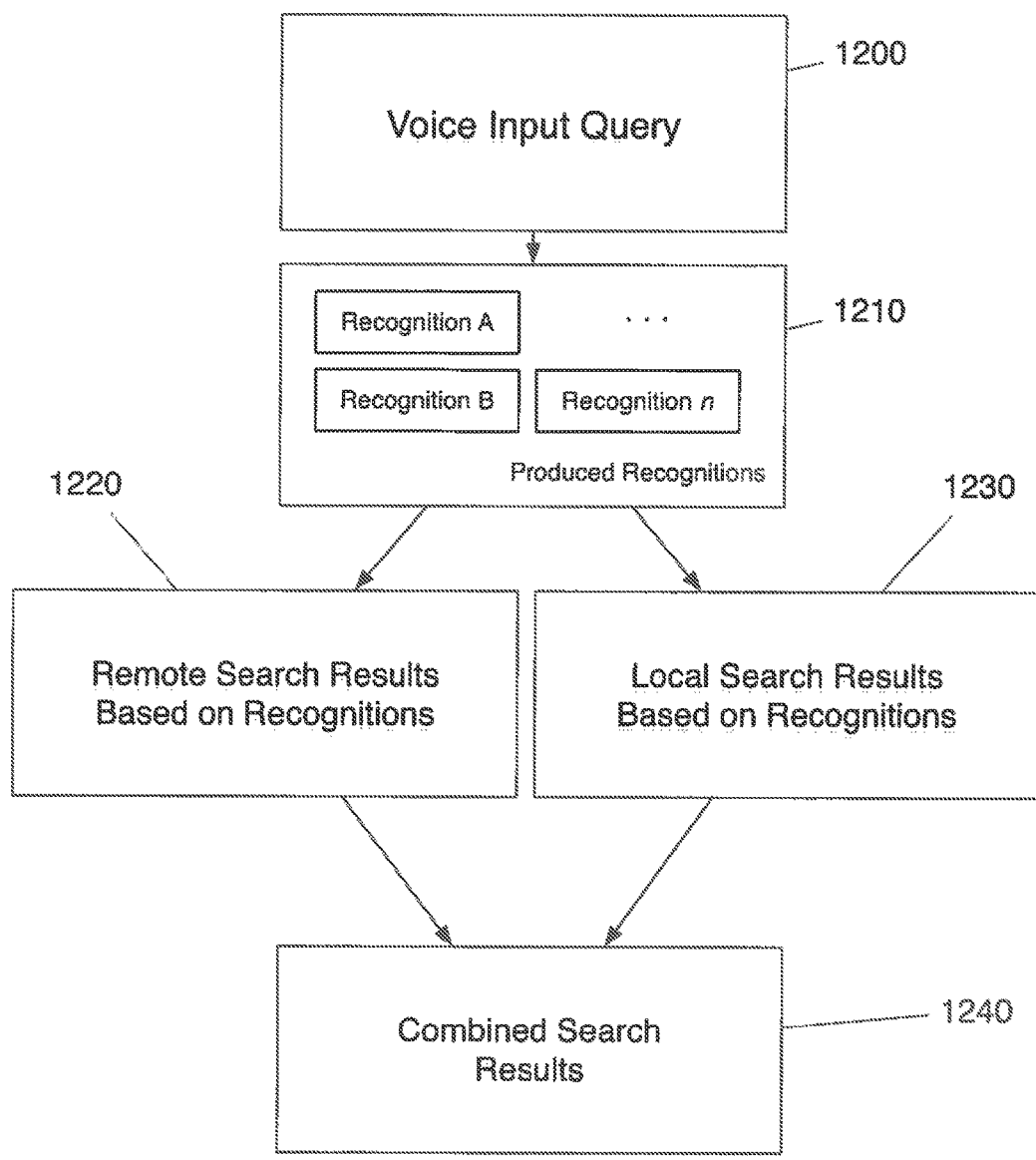
FIG. 12 shows an example of a set of data structures that ultimately yield combined local and remote search results based on speech to text recognitions from a voice input query.

FIG. 12 shows an example of a set of data structures that ultimately yield combined local and remote search results based on speech to text recognitions from a voice input query. The voice input query 1200 is transmitted to one or more data processing systems to produce one or more speech to text recognitions 1210. Using the set of produced recognitions 1210, remote search results 1220 and local search results 1230 are produced by executing queries determined by the produced recognitions 1210. As discussed above, the remote search can happen in parallel to the local search as illustrated in FIG. 12. At the end of the method, remote search results 1220 and local search results 1230 are combined to form combined search results 1240 which are then presented to the user. The presentation of combined search results may be modified by available contextual information as discussed in previous embodiments, as well as other methods. The remote search can, in one embodiment, be performed by the systems and methods described in U.S. patent application Ser. No. 14/503,226, filed Sep. 30, 2014 and entitled "Multi-Domain Query Completion", which U.S. patent application is hereby incorporated herein by reference. These systems and methods can be used to search multiple information domains and provide the results of that searching of the multiple information domains. The multiple information domains can include one or more of: social media postings (e.g. tweets on Twitter); current news; weather, maps; sports scores; stock information; or current movies.

Figure 13:
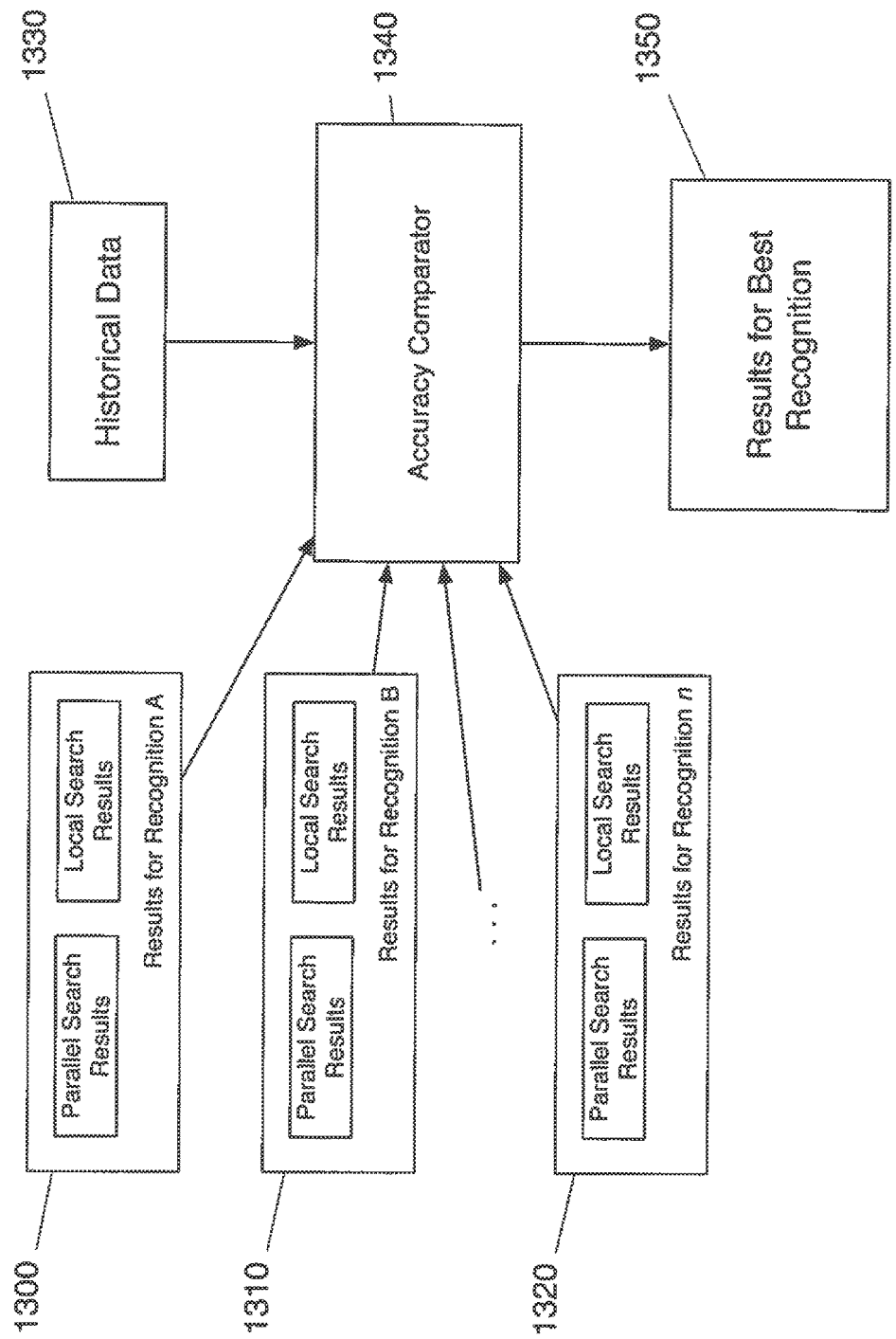
FIG. 13 shows an example of a set of data structures that are used by an accuracy comparator to determine the best speech to text recognition for user voice input.

FIG. 13 shows an example of a set of data structures that are used by an accuracy comparator to determine the best speech to text recognition for user voice input. For an arbitrary number of speech to text recognitions produced from a user's voice input, results for the recognitions 1300, 1310, and 1320 may be compared with historical data 1330 using accuracy comparator 1340. Accuracy comparator 1340 can determine which speech to text recognition has the highest probability of being accurate. In one embodiment, the determination of the probability of a recognition being accurate can be based on a comparison of the results produced by the one or more search queries and parallel queries based on the one or more speech to text recognitions. The determination can be based, for example, on the recognition that produced the largest number of local search results. Once the best recognition has been determined, the results 1350 for queries based on that recognition are presented to the user who provided the voice input as a search query.

In one embodiment, the probability of accurate speech to text recognition is determined by resolving ambiguities in the user's voice input. The ambiguities can be resolved, for example, by distinguishing between likely utterances and unlikely utterances in the user's voice input and determining whether an unlikely utterance produces more local search results than a likely utterance. For example, a search including an atypical name for a person, such as "pictures of Inda," may be recognized as "pictures of India." Such a query may produce a large number of results in the parallel search of remotely stored indices, but fail to produce many results in the search of locally storied indices. If the query "pictures of Inda" is executed locally and the user has files with "Inda" in them or their corresponding index entries, the ambiguity of "Inda" vs. "India" can be resolved in favor of "Inda." Similarly, resolving ambiguities can be accomplished by comparing the voice input with historical data from previous searches by the user.

Figure 14:
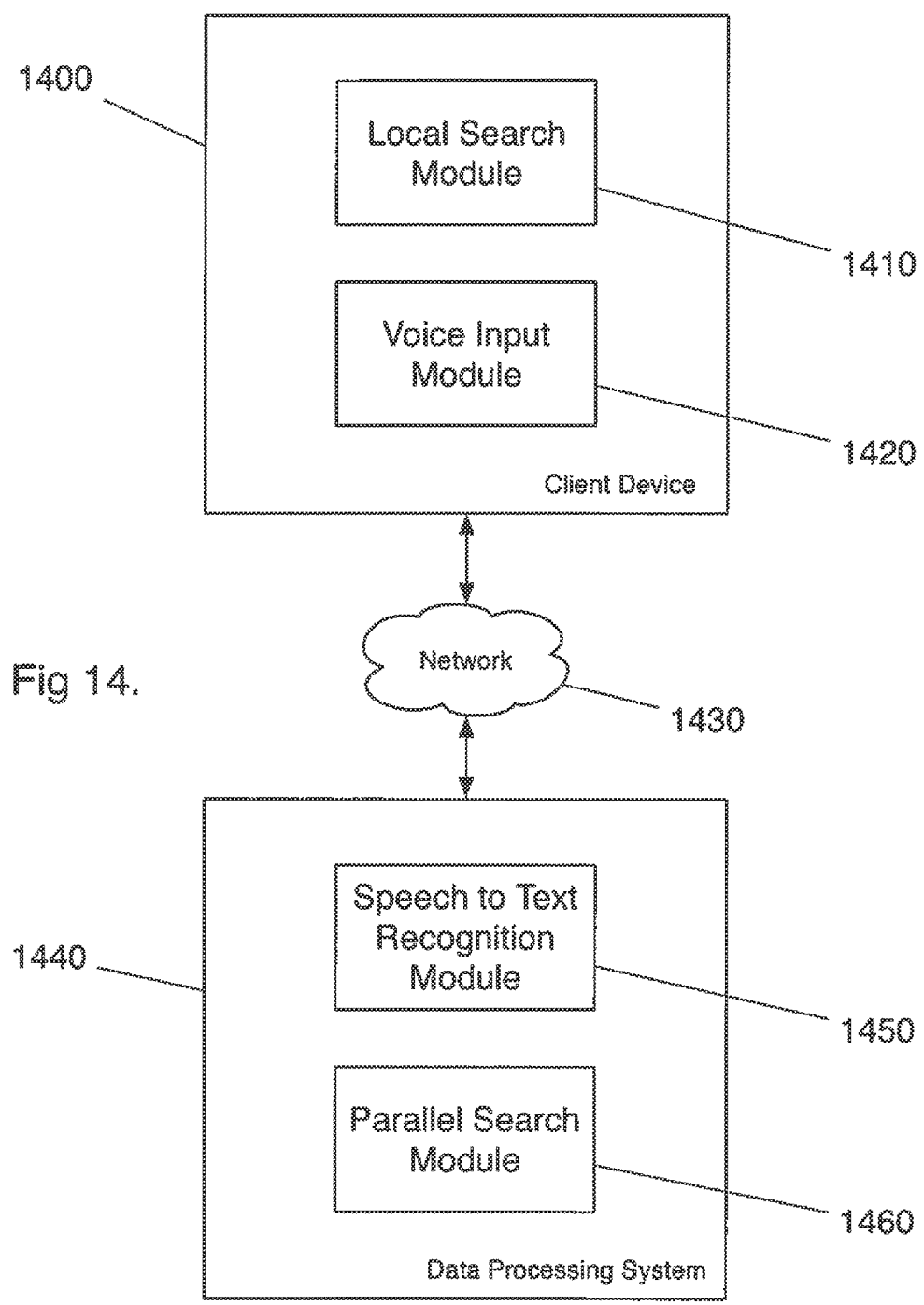
FIG. 14 shows an example of a system that features a client device and data processing system to process voice input queries over a network and present search results to a user.

FIG. 14 shows an example of a system that features a client device and data processing system over a network to process voice input queries and present search results to a user. A client device 1400 with a voice input module 1420 can receive a user voice input for a search query. Using network 1430 to communicate with data processing system 1440, data processing system 1440 can use speech to text recognition module 1450 to produce one or more speech to text recognitions. Using these recognitions, data processing system 1440 can also determine one or more search queries to execute with parallel search module 1460. Similarly, using these recognitions, client device 1400 can determine one or more search queries to execute with local search module 1410. Using network 1430, data processing system 1440 can transmit, independently or as a group, the one or more speech to text recognitions, determined search queries, and parallel search results to the client device 1400.

Figure 15:
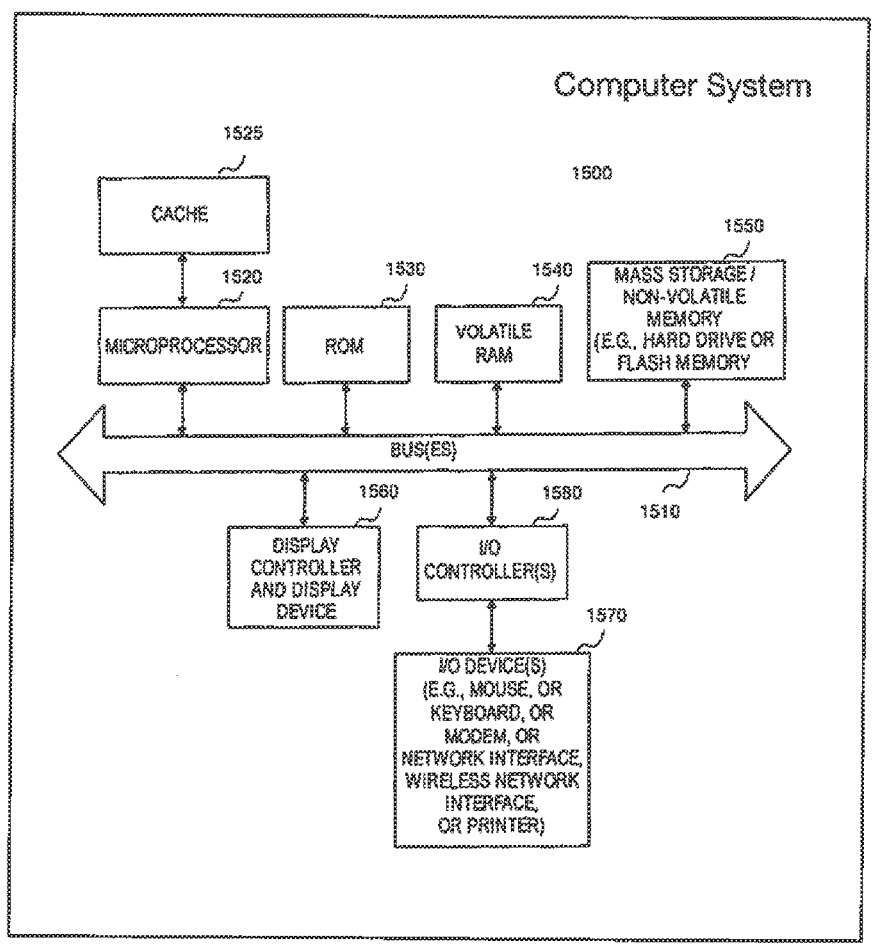
FIG. 15 shows an embodiment of a computer which can be used with one or more methods described herein and which can include one or more non-transitory machine readable media, such as volatile DRAM or flash memory, etc.

FIG. 15 shows one example of a data processing system, which may be used with any one of the embodiments described herein. Note that while FIG. 15 illustrates various components of a data processing system, it is not intended to represent any particular architecture or manner of interconnecting the components as such details are not germane to this description. It will also be appreciated that network computers, tablet computers, consumer electronic devices and other data processing systems which have fewer components or perhaps more components may also be used with one or more embodiments described herein.

As shown in FIG. 15, the computer system 1500, which is a form of a data processing system, includes a bus 1510 which is couple to one or more microprocessor(s) 1520 and a ROM (Read Only Memory) 1530 and volatile RAM (Random Access Memory) 1540 and a non-volatile memory 1550. The microprocessor 1520 is coupled to optional cache 1525. The microprocessor 1520 may retrieve the stored instructions from one or more of the memories 1530, 1540 and 1550 and execute the instructions to perform operations described above. These memories represent examples of machine readable non-transitory storage media that can store or contain computer program instructions which when executed cause a data processing system to perform the one or more methods described herein. The bus 1510 interconnects these various components together and also interconnects these components 1520, 1530, 1540 and 1550 to a display controller and display device 1560 and to peripheral devices such as input/output (I/O) devices 1570 which may be one or more of mice, touch screens, touch pads, touch sensitive input devices, keyboards, modems, network interfaces, printers and other devices which are well known in the art. Typically, the input/output devices 1570 are coupled to the system through input/output controllers 1580. The volatile RAM 1540 is typically implemented as dynamic RAM (DRAM) which requires power continually in order to refresh or maintain the data in memory.

The mass storage 1550 is typically a magnetic hard drive or a magnetic optical drive or an optical drive or a DVD RAM or a flash memory or other types of memory system which maintain data (e.g., large amounts of data) even after power is removed from the system. Typically the mass storage 1550 will also be a random access memory although this is not required. While FIG. 15 shows that the mass storage 1550 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 1510 may include one or more buses connected to each other through various bridges, controllers and/or adapters as is well known in the art.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

In the foregoing specification, specific exemplary embodiments have been described. It will be evident that various modifications may be made to those embodiments without departing from the broader spirit and scope set forth in the following claims. The specification and drawings are, accordingly, to be regarded as illustrative sense rather than a restrictive sense.

We claim:

1. A machine implemented method for providing a search functionality on a computer, the method comprising:
   receiving a search query, wherein the search query is a user's voice input;
   transmitting, over one or more networks, the search query to one or more data processing systems to produce one or more speech to text recognitions and execute one or more parallel search queries based on the one or more speech to text recognitions, the parallel search queries being used to search one or more remotely stored indices;
   receiving, from the one or more data processing systems, the one or more speech to text recognitions and results of the one or more parallel search queries;
   determining one or more local search queries based on the speech to text recognitions of the received query;
   executing the one or more local search queries to search a locally stored index using the one or more speech to text recognitions; and
   presenting combined results of the one or more local search queries and the parallel search queries, wherein the presentation of the combined results of the one or more local search queries and the parallel search queries is based on the speech to text recognition that has a highest probability of being accurate and the probability that a speech to text recognition is accurate is based on at least comparing the results of the one or more local search queries, the parallel search queries, and the respective speech to text recognitions on which they are based, and a higher probability of accurate recognition is determined when a speech to text recognition produces the largest results for one of the one or more local search queries.

2. The machine implemented method of claim 1, wherein the probability of accurate speech to text recognition is further determined by resolving ambiguities in the user's voice input.

3. The machine implemented method of claim 2, further comprising:
   wherein resolving ambiguities includes distinguishing between likely utterances and unlikely utterances in the user's voice input; and
   determining whether an unlikely utterance produces more local search results than a likely utterance.

4. The machine implemented method of claim 2, further comprising:
   wherein resolving ambiguities includes comparing voice input with historical data from previous searches by the user.

5. The method of claim 1 wherein the one or more remotely stored indices include a set of one or more information domains including: (a) social media postings; (b) current news; (c) weather; (d) maps; (e) sports scores; (f) stock information; or (g) current movies.

6. The method of claim 5 wherein the locally stored index includes one or both of content and metadata of a plurality of different files, having different file types, created by a plurality of different applications.

7. A non-transitory machine readable medium storing executable program instructions which when executed by a data processing system cause the system to perform a method for providing a search functionality, the method comprising:
   receiving a search query, wherein the search query is a user's voice input;
   transmitting, over one or more networks, the search query to one or more data processing systems to produce one or more speech to text recognitions and execute one or more parallel search queries based on the one or more speech to text recognitions, the parallel search queries being used to search one or more remotely stored indices;
   receiving, from the one or more data processing systems, the one or more speech to text recognitions and results of the one or more parallel search queries;
   determining one or more local search queries based on the speech to text recognitions of the received query;
   executing the one or more local search queries to search a locally stored index using the one or more speech to text recognitions; and
   presenting combined results of the one or more local search queries and the parallel search queries, wherein the presentation of the combined results of the one or more local search queries and the parallel search queries is based on the speech to text recognition that has a highest probability of being accurate and the probability that a speech to text recognition is accurate is based on at least comparing the results of the one or more local search queries, the parallel search queries, and the respective speech to text recognitions on which they are based, and a higher probability of accurate recognition is determined when a speech to text recognition produces the largest results for one of the one or more local search queries.

8. The medium of claim 7, wherein the probability of accurate speech to text recognition is further determined by resolving ambiguities in the user's voice input.

9. The medium of claim 8, the method further comprising:
wherein resolving ambiguities includes distinguishing between likely utterances and unlikely utterances in the user's voice input; and
determining whether an unlikely utterance produces more local search results than a likely utterance.

10. The medium of claim 8, further comprising:
wherein resolving ambiguities includes comparing voice input with historical data from previous searches by the user.

11. The medium of claim 7 wherein the one or more remotely stored indices include a set of one or more information domains including: (a) social media postings; (b) current news; (c) weather; (d) maps; (e) sports scores; (f) stock information; or (g) current movies.

12. The medium of claim 11 wherein the locally stored index includes one or both of content and metadata of a plurality of different files created by a plurality of different applications and being of different file types.

13. A data processing system that provides a search functionality, the data processing system comprising:
one or more processors; and
a memory coupled to the one or more processors, the memory storing executable instructions which when executed by the one or more processors cause the one or more processors to perform a method comprising,
receiving a search query, wherein the search query is a user's voice input,
transmitting, over one or more networks, the search query to one or more data processing systems to produce one or more speech to text recognitions and execute one or more parallel search queries based on the one or more speech to text recognitions, the parallel search queries being used to search one or more remotely stored indices,
receiving, from the one or more data processing systems, the one or more speech to text recognitions and results of the one or more parallel search queries,
determining one or more local search queries based on the speech to text recognitions of the received query,
executing the one or more local search queries to search a locally stored index using the one or more speech to text recognitions, and
presenting combined results of the one or more local search queries and the parallel search queries, wherein the presentation of the combined results of the one or more local search queries and the parallel search queries is based on the speech to text recognition that has a highest probability of being accurate and the probability that a speech to text recognition is accurate is based on at least comparing the results of the one or more local search queries, the parallel search queries, and the respective speech to text recognitions on which they are based, and a higher probability of accurate recognition is determined when a speech to text recognition produces the largest results for one of the one or more local search queries.

* * * * *